United States Patent [19]

Shigihara et al.

[11] Patent Number: 4,512,801
[45] Date of Patent: Apr. 23, 1985

[54] APPARATUS FOR AND METHOD OF DESULFURIZING AND HEATING MOLTEN METAL

[75] Inventors: Shigeyuki Shigihara; Masahiro Tadokoro, both of Ise, Japan

[73] Assignee: Shinko Electric Co. Ltd., Tokyo, Japan

[21] Appl. No.: 561,650

[22] Filed: Dec. 15, 1983

[30] Foreign Application Priority Data

Dec. 21, 1982 [JP] Japan .............................. 57-224666
Dec. 21, 1982 [JP] Japan .............................. 57-224667

[51] Int. Cl.³ ............................................. C21C 7/02
[52] U.S. Cl. ........................................ 75/58; 75/10 R; 75/12; 75/93 R
[58] Field of Search .............. 75/58, 61, 93 R, 10-12

[56] References Cited

U.S. PATENT DOCUMENTS 3,490,897  1/1970  Dore ..................................... 75/76
3,572,671  3/1971  Worner .................................. 75/49

Primary Examiner—Peter D. Rosenberg
Attorney, Agent, or Firm—Scully, Scott, Murphy and Presser

[57] ABSTRACT

Apparatus for desulfurizing and heating molten metal includes a refractory body having an open top receptacle, an outlet and a passageway communicating the receptacle with the outlet. An electric coil is disposed in surrounding relation to the receptacle. The upper end of the coil is disposed generally equal to the level of the molten metal in the receptacle. The molten metal is supplied to the receptacle through a first feed member, and a desulfurizing agent is supplied to the receptacle through a second feed member. Upon excitation of the coil, electric currents are induced in the molten metal to heat it and also to agitate it to mix the desulfurizing agent with the molten metal.

3 Claims, 6 Drawing Figures

APPARATUS FOR AND METHOD OF DESULFURIZING AND HEATING MOLTEN METAL

BACKGROUND OF THE INVENTION

1. Field of the Invention

This invention deals with the art of desulfurizing molten metal such as iron for use in casting.

2. Prior Art

In the manufacture of cast iron, pig iron is melted usually in a cupola with coke. The molten iron in the cupola contains a considerable amount of sulfur because of the use of coke as a fuel for the cupola. Spheroidal graphite cast iron has now been extensively used because of its high quality. A spheroid-promoting agent such as silicon is added to the molten iron in the cupola to form the spheroidal graphite cast iron. However, the sulfur content of the molten iron prevents the graphite in the resultant cast iron from becoming spheroidal to a desired degree. Therefore, it is a common practice in the art to desulfurize the molten iron before the spheroid-promoting agent is applied to the molten iron. The desulfurization is carried out by applying a pulverized desulfurizing agent to the molten iron and then agitating this molten iron. This agitation is necessary for promoting the reaction of the desulfurizing agent with the sulfur in the molten iron. Calcium carbide, calcium oxide or the like is used as the desulfurizing agent. In the case where calcium carbide is used as the desulfurizing agent, the following reaction is obtained at the time of the desulfurization:

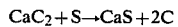

$$CaC_2 + S \rightarrow CaS + 2C$$

CaS constitutes a slag and floats on the top of the molten iron. This slag is gasified and dissipated into the ambient atmosphere when the molten iron is at elevated temperatures. Since the desulfurizing agent has a relatively low specific gravity, it is necessary to agitate the molten metal to promote the above-mentioned reaction. One such desulfurizing method is known as a porous plug method. In this method, a porous plug is mounted on the bottom of a vessel for holding the molten iron. The desulfurizing agent is applied to the molten iron in the vessel, and inert gas such as nitrogen gas is introduced into the vessel through the porous plug to produce bubbles which move upwardly to agitate the molten iron. Another conventional desulfurizing method is known as a gas injection method. In this method, a pipe made of a refractory material is introduced into the molten iron in a vessel. Powder of carbide carried by nitrogen gas is fed through the refractory pipe to the molten iron in the vessel, thereby causing the agitation of the molten iron to effect the desulfurization thereof. These two desulfurizing methods have been found disadvantageous in that the molten iron in the vessel is subjected to a relatively large temperature drop because of the agitation of the molten iron. Therefore, it has heretofore been necessary to provide a separate heating means for heating the desulfurized molten iron to compensate for the temperature drop thereof. This is undesirable from an economical point of view. For example, the temperature of the molten iron discharged from the cupola is 1550° C., and the temperature of the molten iron in the desulfurizing apparatus of the porous plug type is 1450° C. And, the temperature of the desulfurized molten iron discharged from the desulfurizing apparatus is 1400° C. The desulfurized molten iron is transferred to molds to form castings. The temperature of the molten iron required for casting products of relatively small size or thickness is 1400° to 1430° C. The molten iron discharged from the desulfurizing apparatus is further subjected to a temperature drop during a time period when it is transferred to the molds. Thus, the temperature of the molten iron discharged from the desulfurizing apparatus is not practical. For this reason, the above-mentioned heating means such as an induction furnace is required, which increases the installation cost.

SUMMARY OF THE INVENTION

It is therefore an object of this invention to provide an electromagnetic desulfurizing apparatus which can efficiently agitate and heat a molten metal.

According to the present invention, there is provided an apparatus for desulfurizing and heating molten metal which comprises a body of a refractory material including an open top receptacle, an outlet, and a passageway extending upwardly from the receptacle at a bottom thereof to the outlet for communicating the receptacle with said outlet; an electric coil disposed in surrounding relation to the receptacle, the upper end of the coil being disposed generally equal to the level of the outlet, so that the level of the molten metal in the receptacle is generally equal to the upper end of the coil; a first feed means for supplying molten metal to the receptacle; and a second feed means for supplying a desulfurizing agent to the receptacle; whereby upon excitation of the coil, electric currents are induced in the molten metal to heat it and also to agitate it to mix the desulfurizing agent with the molten metal.

The flow rate of the molten metal discharged from the first feed means and the capacity of the receptacle are determined in such a manner that a time of residence of the molten metal in the receptacle is 5 to 10 minutes. The ratio of the inner diameter to depth of the receptacle is determined in such a manner that a height of a bulged surface of the molten metal caused by the agitation thereof is 8 to 16 cm when electric power is supplied to the coil to raise the temperature of the molten metal in the receptacle by 50° to 100° C. With this arrangement, the receptacle can be formed to a minimum size while achieving the heating and agitation of the molten metal quite efficiently.

DESCRIPTION OF THE PREFERRED EMBODIMENTS OF THE INVENTION

Figure 1:
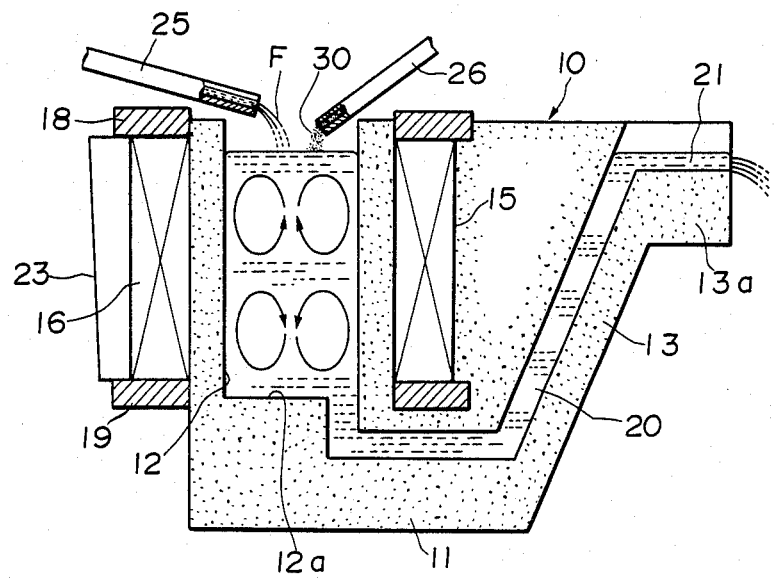
FIG. 1 is a cross-sectional view of a desulfurizing apparatus provided in accordance with the present invention.
Figure 2:
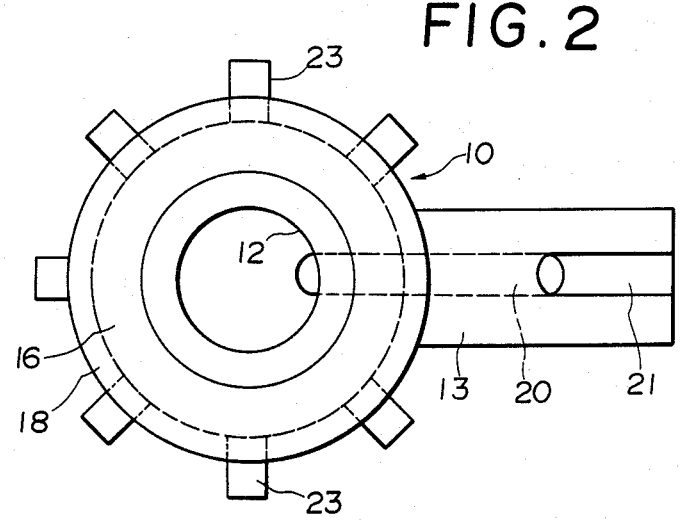
FIG. 2 is a plane view of the desulfurizing apparatus.

FIGS. 1 and 2 show an electromagnetic desulfurizing apparatus 10 which comprises a one-piece body 11 of a refractory material having a circular receptacle or crucible 12 and an extension 13 extending from the outer peripheral wall of the receptacle 12, the receptacle 12 having an open top. An opening 15 is formed through the extension 13 adjacent to the receptacle 12, the opening 15 also having an open top. An electric coil 16 is wound around the receptacle 12, the coil 16 passing through the opening 15. A pair of upper and lower annular support members 18 and 19 are fixedly secured to the body 11 by bolts or the like and hold the coil 16 therebetween against movement, the annular members 18 and 19 passing through the opening 15.

A passageway 20 extends from the bottom 12a of the receptacle 12 through the extension 13 to an outlet 21 provided at the upper portion 13a of the extension 13, the outlet 21 being disposed horizontally. The receptacle 12 communicates with the passageway 20.

A plurality of elongated iron members 23 are provided around the coil 16 in circumferentially spaced relation to one another, the iron members 23 being disposed vertically and supported by the upper and lower annular members 18 and 19. Although not shown in the drawings, an iron shell is mounted in surrounding relation to the apparatus body 11. The iron members 23 serve as paths for magnetic fluxes produced by the excited coil 16 and prevent any leakage magnetic flux from flowing to the iron shell, so that the generation of heat in the iron shell due to eddy current is prevented.

The coil 16 comprises a hollow wire of copper, and water is adapted to pass through the interior of the hollow wire so as to cool the coil 16 during the excitation thereof.

Molten iron F is fed from a cupola (not shown) to the receptacle 12 through a feed trough 25. A desulfurizing agent 30 is fed to the receptacle 12 through a feed pipe 26. The desulfurizing agent is in the form of powder and is composed predominantly of either calcium carbide ($CaS_2$) or calcium oxide (CaO).

The body 11 of the electromagnetic desulfurizing apparatus 10 is formed by compacting a refractory powder material into a predetermined shape and sintering it.

In operation, when a single alternating voltage is applied to the coil 16, magnetic flux is produced around the coil 16 in a well-known manner. The magnetic flux passes through the molten iron F in the receptacle 12 so that eddy currents are produced in the molten iron F. Heat is generated in the molten iron F by the eddy currents and increases the temperature of the molten iron F. Also, electric currents flow in the molten iron F in a direction opposite to the direction of the current passing through the coil 16. Since these currents flow in the same direction, repulsive forces are exerted on those portions of the molten iron where these current flow, thereby imparting a radial inward motion to the portion of the molten iron disposed adjacent to the inner peripheral wall of the receptacle 12. As a result, the molten iron F flows in directions indicated by arrows in FIG. 1, thereby causing the agitation of the molten iron F, as is the case with the conventional induction furnace. Thus, the coil 16 serves to increase the temperature of the molten iron F in the receptacle 12 and also to agitate the molten iron F.

The molten iron is continuously fed from the cupola through the feed trough 25 to the receptacle 12 at a predetermined feed rate. At the same time, the desulfurizing agent is continuously fed to the receptacle 12 through the feed pipe 26 at a predetermined feed rate. The desulfurizing agent is uniformly mixed with the molten iron F in the receptacle 12 through the agitation of the molten iron effected by the excited coil 16 as mentioned above, so that the molten iron F is desulfurized. The desulfurized molten iron F is continuously discharged from the outlet 21 through the passageway 20 and is transferred to molds (not shown) for the casting of products. The desulfurizing molten iron is continuously discharged from the outlet 21 at a rate equal to the rate of feed of the molten iron to the receptacle 12.

The outlet 21 is disposed at such a level that the level of the molten iron F in the receptacle 12 becomes generally equal to the upper end of the coil 16 when the desulfurized molten iron begins to be discharged from the outlet 21. Shortly, the upper end of the coil 16 is generally equal to the level of the outlet 21. The reason that the upper end of the coil 16 is disposed at the level of the molten iron F in the receptacle 12 is to enhance the utilization of the electromagnetic induction to which the molten iron is subjected, so that a satisfactory agitation of the molten iron can be achieved. If the upper end of the coil 16 is disposed at a level lower than the level of the molten iron F in the receptacle 12, the upper portion of the molten iron near its surface is not subjected to electromagnetic induction so that this upper portion is not satisfactorily agitated because of the presence of the static pressure, although the utilization of the electromagnetic induction is improved. On the other hand, if the upper end of the coil 16 is disposed at a level higher than the level of the molten iron F in the receptacle 12, the utilization of the electromagnetic induction is worsened.

The temperature of the molten iron at each stage of the process is as follows:

For example, the temperature of the molten iron discharged from the cupola is 1550° C.; the temperature of the molten iron in the desulfurizing apparatus 10 is 1500° C.; and the temperature of the desulfurized molten iron discharged from the desulfurizing apparatus 10 is 1450° C. The desulfurized molten iron is applied to molds for casting. The temperature of the molten iron in the desulfurizing apparatus 10 is 50° C. higher than the temperature of the molten iron in the conventional desulfurizing apparatus of the porous plug type.

For example, the cupola outputs 2000 kg of molten iron per hour, and the temperature of the molten iron discharged from the cupola is 1550° C. The desulfurizing apparatus 10 has a capacity for holding 400 kg of the molten iron. The coil 16 has an electric power of 100 KW. A residence time of the molten iron in the desulfurizing apparatus 10 is 12 minutes ($400/2000 \times 60$).

The molten iron, which has been introduced into the passageway 20 before the molten iron in the receptacle 12 reaches the predetermined level generally equal to the level of the outlet 21, is not subjected to desulfurization and therefore may be discarded.

Figure 3:
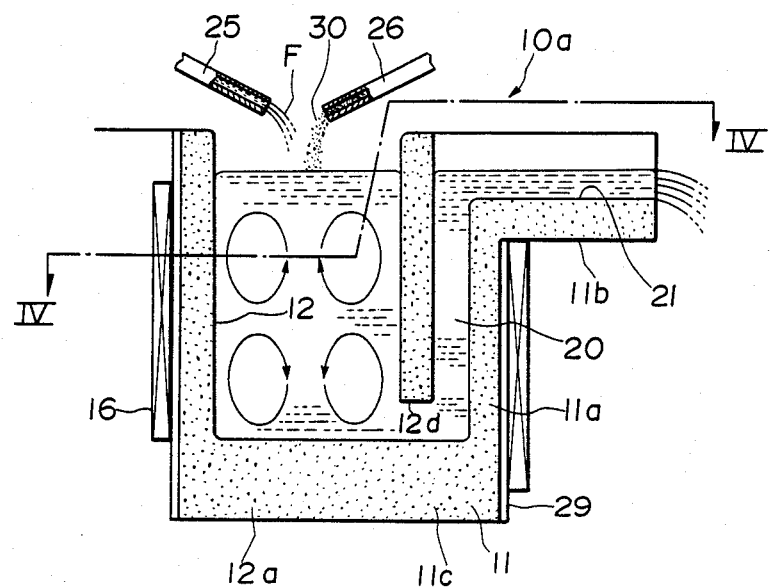
FIG. 3 is a view similar to FIG. 1 but showing a modified desulfurizing apparatus.
Figure 4:
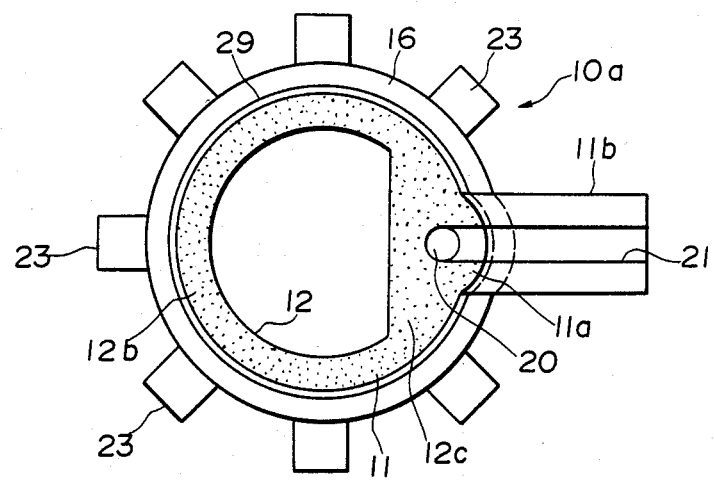
FIG. 4 is a plan view of the desulfurizing apparatus of FIG. 3.

FIGS. 3 and 4 show a modified desulfurizing apparatus 10a which differs from the desulfurizing apparatus 10 of FIGS. 1 and 2 in that a passageway 20 is disposed vertically adjacent to a receptacle 12 and communicates with a horizontally-disposed outlet 21 and the receptacle 12 at its upper and lower ends, respectively, and that the passageway 21 is disposed within an electrical coil 16 wound around a body 11 of the desulfurizing apparatus 10a.

The unitary body 11 of the desulfurizing apparatus 10a of a circular cross-section having a protuberance 11a of a semi-cylindrical cross-section. A horizontal protrusion 11b extends from the upper portion of the body 11 adjacent to the protuberance 11a. The open-top receptacle 12 has a semi-cylindrical cross-section and is defined by a semi-circular wall 12b, a thickened wall 12c and a bottom or base 12a. The passageway 20 is formed through the thickened wall 12c disposed in registry with the protuberance 11a, and communicates with receptacle 12 through a port 12d formed in the thickened wall 12c adjacent to the bottom 12a. the outlet 21 for discharging the desulfurized molten iron is formed through the protrusion 11b. A refractory member 29 is mounted on the outer periphery of the body 11. The coil 16 is mounted around the refractory member 29. Iron members 23 are mounted around the coil 16 in circumferentially spaced relation to one another.

As described above for the desulfurizing apparatus 10 of FIGS. 1 and 2, molten iron F is fed from a cupola (not shown) to the receptacle 12 through a feed trough 25. A desulfurizing agent 30 in the form of powder is fed to the receptacle 12 through a feed tube 26.

That portion of the coil 16 disposed in registry with the protuberance 11a is displaced downwardly with respect to the remaining major portion of the coil 16. Said that portion of the coil 16 is held against the underside of the protrusion 11b. And, the upper end of the coil 16 is disposed generally at the level of the molten iron F in the receptacle 12 which is equal to the level of the outlet 21. With this arrangement, the molten iron F in the receptacle 12 is efficiently agitated for the reasons described above for the desulfurizing apparatus 10 in FIGS. 1 and 2.

Figure 5:
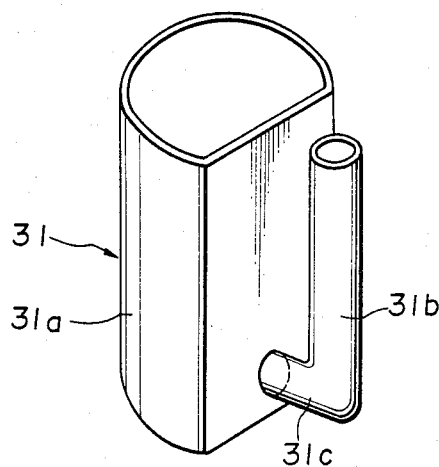
FIG. 5 is a perspective view of a core used for forming the desulfurizing apparatus of FIG. 4.

A core 31 of iron shown in FIG. 5 is used for forming the desulfurizing apparatus 10a. The core 31 of a one-piece construction comprises a hollow body 31a, a tubular portion 31b, and a connecting portion 31c interconnecting the body 31a and the tubular body 31b, the hollow body 31a having an open top and a closed bottom. The hollow body 31a, the connecting portion 31c and the tubular body 31b correspond in shape to the receptacle 12, the port 12d and the passageway 20, respectively. The refractory member 29 is first placed on a flat surface, and a predetermined amount of powder refractory material is introduced into the refractory member 29 to provide the base 11c. Then, the core 31 is placed in the refractory member 29 with its bottom resting on the base 11c, the core 31 being disposed in radially spaced relation to the refractory member 29 to form a space therebetween. Then, powder refractory material is filled in this space, using a filling vibrator. Then, the coil 16 is mounted around the refractory member·29. Finally, the coil 16 is excited so that the core 31 is subjected to electromagnetic induction and is heated to elevated temperatures. As a result, the powder refractory material is sintered. Then, when the molten iron F is introduced into the core 31, the core 31 is melted by the heat of the molten iron to form the receptacle 12, the port 12d and the passageway 20. Also, the sintering of the refractory material is further effected.

Thus, the desulfurizing apparatus 10a can be manufactured easily and quickly. Therefore, when the refractory material of the desulfurizing apparatus is subjected to damage due to the slag, the body 11 is destroyed, and a new desulfurizing apparatus can be easily manufactured in the manner described.

Since the body 11 has a generally circular cross-section, the iron members 23 can be provided at any suitable locations around the coil 16. With this construction, external structural members are prevented from being subjected to heat due to eddy current caused by the coil 16.

Further, since the passageway 20 is disposed within the coil 16 and positioned adjacent to the receptacle 12, the heat of the molten iron F in the receptacle is transmitted to the desulfurized molten iron in the passageway 20, so that the molten iron in the passageway 20 is subjected to less temperature drop.

One example of the desulfurizing apparatus 10a will now be described.

The residence time T (min.) of the molten iron F in the receptacle 12 is determined by the following formula:

$$T = W/Q \tag{1}$$

wherein W (kg) is a capacity of the receptacle 12, i.e., the amount of the molten iron which the receptacle 12 can hold, and Q (kg/min.) is a flow rate of the molten iron discharged from the feed trough 25 leading to the cupola. The residence time T is the time used for desulfurizing the molten iron F. With this desulfurizing apparatus, it has been found that the optimum residence time T is 5 to 10 minutes. The flow rate Q of the molten iron from the feed trough 25 is predetermined. Therefore, the capacity W of the receptacle 12 is so determined that the residence time T is 5 to 10 minutes.

For example, in the manufacture of ductile cast iron using the conventional desulfurizing method, the temperature of the molten iron discharged from the cupola is 1530° C. The temperature of the molten iron in the desulfurizing apparatus is 1450° C. (optimum temperature: 1500° C.). The temperature of the molten iron subjected to the graphite spheroidal treatment is 1400° C. (optimum temperature: 1480° C.). The casting temperature is 1350° C. (optimum temperature: 1420° C.). Thus, the actual temperatures of the molten iron at the above stages of the conventional desulfurizing method are lower than the respective optimum temperatures and must be raised by at least 50° C. Generally, a temperature rise of 50 to 100° C. will suffice.

Generally, the specific heat of cast iron is represented by the following formula:

$$P_{100} = 21 \text{ (Kwh/ton)} \tag{2}$$

This means that 21 kwh of heat energy is required for raising the temperature of the molten iron by 100° C. Therefore, assuming that the flow rate of the molten iron discharged from the feed trough 25 is Q' (ton/min.), electric power (kw) required for raising the temperature of the molten iron in the receptacle 12 by $\Delta Te$ degrees ($50 \leq \Delta Te \leq 100$) is represented by the following:

$$P = 21 \times \frac{\Delta Te}{100} \times \frac{T}{60} \times 60 \times Q' \tag{3}$$
$$= 0.21 \, \Delta Te \cdot T \cdot Q'$$

Q' (ton/min.) is replaced by Q (kg/min.) and the constant is replaced by $K_1$ to obtain the following:

$$P = K_1 \cdot \Delta Te \cdot T \cdot Q \tag{4}$$

Therefore, electric power P determined by the above formula (4) must be induced in the molten iron in the receptacle 12, and electric power supplied to the coil 16 is determined based on the electric power P. Almost all of the electric power induced in the molten iron in the receptacle 12 is converted to heat energy, and not more than 0.1% of the induced electric power serves as energy for agitating the molten iron.

Figure 6:
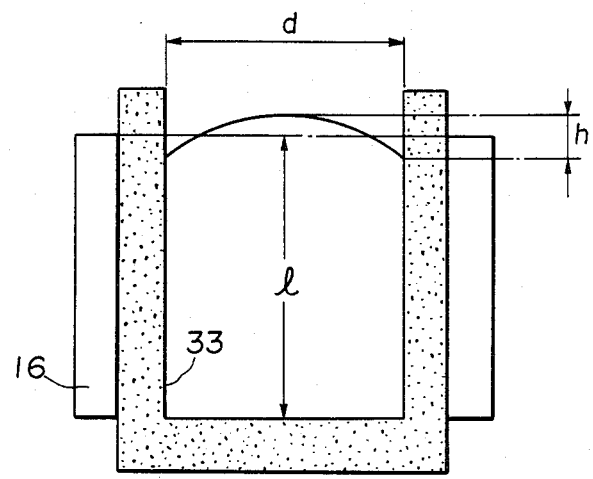
FIG. 6 is a cross-sectional view of a model receptacle.

FIG. 6 shows a model receptacle 33 of a cylindrical shape corresponding to the receptacle 12 of the desulfurizing apparatus 10a. The model receptacle 33 has an inner diameter d and an effective depth 1. The depth 1 is determined by the level of the outlet 21. As described above, when the coil 16 is excited to agitate the molten iron, the surface of the molten iron is bulged as shown in FIG. 6. The height h of the bulged portion is represented by the following formula:

$$h \text{ (cm)} = \frac{0.316}{\sqrt{\rho f}} \times \frac{P \times 10^3}{\pi \cdot d \cdot l \cdot s} \quad (5)$$

wherein $\rho(\Omega cm)$ is specific resistance of the molten iron, P (kw) is electric power induced in the molten iron, s (g/cm$^3$) is specific gravity of the molten iron, and f (Hz) if frequency of electric current supplied to the coil 16.

The height h corresponds to the intensity of the agitation of the molten iron. It has been found that when the height h is 8 to 16 cm, the molten iron is sufficiently agitated to effect a satisfactory desulfurization of the molten iron. As can be seen from the above formula (5), the agitation force is proportional to the electric power supplied to the coil 16 and is inversely proportional to the diameter and depth of the receptacle.

The constants $\rho, f, \pi s, 3.16$ and $10^3$ and replaced by $K_2$, and dl is replaced by $\eta$ to obtain the following formula:

$$h = K_2 \frac{P}{\eta} \quad (6)$$

Then, h is replaced by 8 to 16, and P is replaced by a value determined by a desired temperature rise of the molten iron in the receptacle, so that a valve of $\eta$ (dl) which can achieve a sufficient agitation is determined.

An effective capacity V of the model receptacle 33 (FIG. 6) is obtained from the following:

$$V = \frac{\pi d^2}{4} \cdot l \quad (7)$$

Therefore, the capacity W of the receptacle is obtained from the following:

$$W = \frac{\pi d^2}{4} \cdot l \cdot s \times 10^{-3} \quad (8)$$

The constants are replaced by $K_3$ to obtain the following:

$$W = K_3 \cdot \eta \cdot d \quad (9)$$

When the residence time T, the temperature rise $\Delta Te$, the height h are represented by 5 to 10 minutes, 50 to 100° C. and 8 to 16 cm, respectively, the inner diameter d and the depth 1 of the receptacle, which are minimum but can achieve the maximum efficiency of the desulfurization, agitation and temperature rise, are obtained in the following manner:

(i) The electric power P to be induced in the molten iron in the receptacle is obtained from the above formula (4).

(ii) Then, $\eta$ which can achieve a sufficient agitation is obtained from the above formula (6).

(iii) The minimum capacity W can be obtained from the above formula (1).

(iv) The inner diameter d of the receptacle can be obtained from the above formula (9), using the values of $\eta$ and W obtained in (ii) and (iii), respectively.

(v) The depth 1 of the receptacle can be obtained from the above formula (8), using the values of d and W obtained in (iv) and (iii), respectively.

With this arrangement, the receptacle can be formed to a minimum size while achieving the heating and agitation of the molten iron quite efficiently.

What is claimed is:

1. Apparatus for desulfurizing and heating molten metal which comprises:
   a. a body of a refractory material including an open top receptacle, an outlet, and a passageway extending upwardly from said receptacle at a bottom thereof to said outlet for communicating said receptacle with said outlet;
   b. an electric coil disposed in surrounding relation to said receptacle, the upper end of said coil being disposed generally equal to the level of said outlet, so that the level of the molten metal in said receptacle is generally equal to the upper end of said coil;
   c. a first feed means for supplying molten metal to said receptacle through said open top; and
   a second feed means for supplying a desulfurizing agent to said receptacle through said open top;
   e. whereby upon excitation of said coil, electric currents are induced in said molten metal to heat it and also to agitate it to mix said desulfurizing agent with said molten metal.

2. Apparatus according to claim 1, in which said passageway is disposed adjacent to said receptacle, said coil being disposed in surrounding relation to said passageway.

3. A method of desulfurizing and heating molten metal which comprises the steps of:
   a. providing an apparatus for desulfurizing and heating molten metal which comprises a body of a refractory material including an open top receptacle, an outlet, and a passageway extending upwardly from said receptacle at a bottom thereof to said outlet for communicating said receptacle with said outlet; an electric coil disposed in surrounding relation to said receptacle, the upper end of said coil being disposed generally equal to the level of said outlet, so that the level of the molten metal in said receptacle is generally equal to the upper end of said coil; a first feed means for supplying molten metal to said receptacle through said open top; and a second feed means for supplying a desulfurizing agent to said receptacle through said open top;
   b. determining the flow rate of the molten metal discharged from said first feed means and the capacity of said receptacle in such a manner that a time of residence of the molten metal in said receptacle is 5 to 10 minutes; and
   c. determining the ratio of the inner diameter to depth of said receptacle in such a manner that a height of a bulged surface of the molten metal caused by the agitation thereof is 8 to 16 cm when electric power is supplied to said coil to raise the temperature of the molten metal in said receptacle by 50 to 100° C.

* * * * *